United States Patent
Ke et al.

(10) Patent No.: US 7,824,069 B2
(45) Date of Patent: Nov. 2, 2010

(54) REPLACEABLE LIGHT SOURCE FOR LIGHT SOURCE MODULE AND BACK LIGHT MODULE

(75) Inventors: Therm-Hoo Ke, Hsin-Chu (TW); Ying-Feng Hsu, Hsin-Chu (TW); Chi-Chun Yang, Hsin-Chu (TW); Li-Chuan Yu, Hsin-Chu (TW); Tzu-Yi Liu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 197 days.

(21) Appl. No.: 12/185,363

(22) Filed: Aug. 4, 2008

(65) Prior Publication Data
US 2009/0052176 A1   Feb. 26, 2009

(30) Foreign Application Priority Data
Aug. 22, 2007   (TW) ............... 96131083 A

(51) Int. Cl.
*F21V 21/00* (2006.01)
(52) U.S. Cl. ............... 362/249.01; 362/217.11; 362/255
(58) Field of Classification Search ............... 362/97.1, 362/97.2, 225, 217.11, 217.12, 249.01
See application file for complete search history.

(56) References Cited

U.S. PATENT DOCUMENTS

| | | | |
|---|---|---|---|
| 5,422,751 | A | 6/1995 | Lewis et al. |
| 7,033,063 | B2 | 4/2006 | Cha et al. |
| 2002/0141183 | A1* | 10/2002 | Moon .................... 362/225 |
| 2003/0035283 | A1* | 2/2003 | Lim ...................... 362/97 |
| 2003/0086255 | A1* | 5/2003 | Moon et al. .............. 362/97 |
| 2006/0176420 | A1 | 8/2006 | Choi et al. |

FOREIGN PATENT DOCUMENTS

| | | |
|---|---|---|
| CN | 1805224 | 7/2006 |
| CN | 1971379 | 5/2007 |

OTHER PUBLICATIONS

Chinese language office action dated Jun. 5, 2009.
English language translation of abstract and pertinent parts of CN 1971379.
Chinese language Office Action dated Jul. 4, 2008.
English language translation of abstract of CN 1805224.

\* cited by examiner

*Primary Examiner*—David V Bruce
(74) *Attorney, Agent, or Firm*—Thomas, Kayden, Horstemeyer & Risley

(57) ABSTRACT

The present invention provides a light source module for using in a backlight module which includes a frame, a light source and a lid. The frame has two opposite side walls, and each of the side walls includes an inner side surface, a top surface and a cave. The cave has a first opening and a second opening connected with each other on the inner surface and the top surface respectively. Each of the inner surfaces is facing the other side wall, and the top surface intersects the inner surface with an angle. A light source has two opposite ends, and each of ends includes a positioning block. The positioning block engages with the cave through the second opening, and the light source extends along a first direction perpendicular to the inner surface, through the first opening and towards the opposite side wall of the frame. The lid covers the second opening and restricts the positioning block from moving relatively to the cave from the second opening.

16 Claims, 10 Drawing Sheets

REPLACEABLE LIGHT SOURCE FOR LIGHT SOURCE MODULE AND BACK LIGHT MODULE

This application claims priority based on a Taiwanese Patent Application No. 096131083 filed on Aug. 22, 2007.

BACKGROUND OF THE INVENTION

1. Field of the Invention

The present invention relates to a light source module and backlight module. More particularly, the present invention relates to light source module and backlight module having replaceable light source.

2. Description of the Prior Art

Since liquid crystal display (LCD) panels have low thickness, light weight and portability and also relatively lower radiation than the Cathode Ray Tube (CRT) panels, LCD panels further have low radiation, accordingly, the need for LCD panels in the markets is greatly increased in recent years. In particular, the backlight module is one of the key components of LCD panels. As the manufacture technology for LCD advances, the backlight module also moves toward the market trends of thinness, high brightness and low cost. In order to maintain competitiveness in the future LCD market, the research and development of improved backlight module will be an aspect to strive for in the future.

When the LCD panel used in electronic devices such as LCD monitors, notebooks, portable phones, digital cameras or other used LCD panel's devices has a bright dot or not enough brightness or an area which dose not illuminate, there could be caused by fault in light source fault, end-of-life or other causes. If the malfunction is caused by failed light source, theoretical it only needs to replace the light source in order to reuse the LCD panel.

However, the conventional method of replacing failed light source replaces the entire light source and not just the failed part of the light source. The above-mentioned method of replacing failed light sources will increase the cost for consumer and is also not environmental. In addition, repair the light source often needs to decompose the whole backlight module which increases the difficulty in maintenance, extra cost and the overall repair time, etc.

SUMMARY OF THE INVENTION

It is an objective of the present invention to provide a light source module that has only to replace a light source of a light source module.

It is another objective of the present invention to provide a light source module with simplicity in design.

It is another objective of the present invention to provide a light source module having a replaceable light source suitable for backlight module with different lighting direction.

The present invention provides a light source module to be used in a backlight module. The light source module includes a frame, a light source and a lid. The frame has two opposite side walls, and each of the side walls includes an inner side surface, a top surface and a cave. The cave has a first opening and a second opening connected with each other and formed respectively on the inner surface and the top surface. Each of the inner surfaces is facing the other side wall, and the top surface intersects the inner surface with an angle. A light source has two opposite ends, and each of ends includes a positioning block. The positioning block engages with the cave through the second opening, and the light source extends along a first direction perpendicular to the inner surface, through the first opening and towards the opposite side wall of the frame. The lid covers the second opening and restricts the positioning block from moving relatively to the cave from the second opening.

In the preferred embodiment, a cross-sectional shape of the cave perpendicular to the first direction is identical to a cross-sectional shape of the positioning block in the first direction. In other words, the light source can utilize the extensibility of the positioning block to engage with the cave. The cross-sectional shape of the positioning block along the first direction may include rectangle, a trapezoid or other shapes. As for the above-mentioned trapezoid, the longer edge of the trapezoid is closer to the second opening than the shorter edge of the trapezoid (the longer edge and the short edge are parallel lines of the four edges/sides.) However, in other embodiments, the shorter edge of the trapezoid may also be closer to the second opening than the longer edge of the trapezoid.

Moreover, the lid includes a fastener, and the frame has a trough disposed on the frame and engaged with the fastener. The cave is disposed at one end of the side wall of the frame. The lid is parallel to the first direction and covers the light source. The side wall includes a plurality of caves corresponding to the fasteners and uniformly distributed over the side wall, and the light sources are respectively disposed corresponding to the caves. The lid is parallel to one of the two side walls and covers the side wall.

The present invention also provides a backlight module comprising the above-mentioned of the light source module.

DETAILED DESCRIPTION OF THE PREFERRED EMBODIMENT

The present invention is a light source module having replaceable light source which is fixable by the structure of the frame and a backlight module using the light source module. The above-mentioned light source preferably refers to Cold Cathode Fluorescent Lamps (CCFLs), External Electrode Fluorescent Lamps (EEFLs) or other assemblies of bar-shaped light sources such as light bars made of LED. The replacement mechanism is designed at the frame, and thereby the light source module can be applied to edge-lighting backlight module or bottom-lighting backlight module. In addition, the above-mentioned light source module is preferably used in Flat Panel Displays (FPDs). However, in other embodiments, the light source module can also be used in mobile phones, notebook computes, digital cameras or other large electric billboards, etc. In order to illustrate the present invention, various embodiments and structure thereof are described below and accompanied with drawings.

Figure 1:
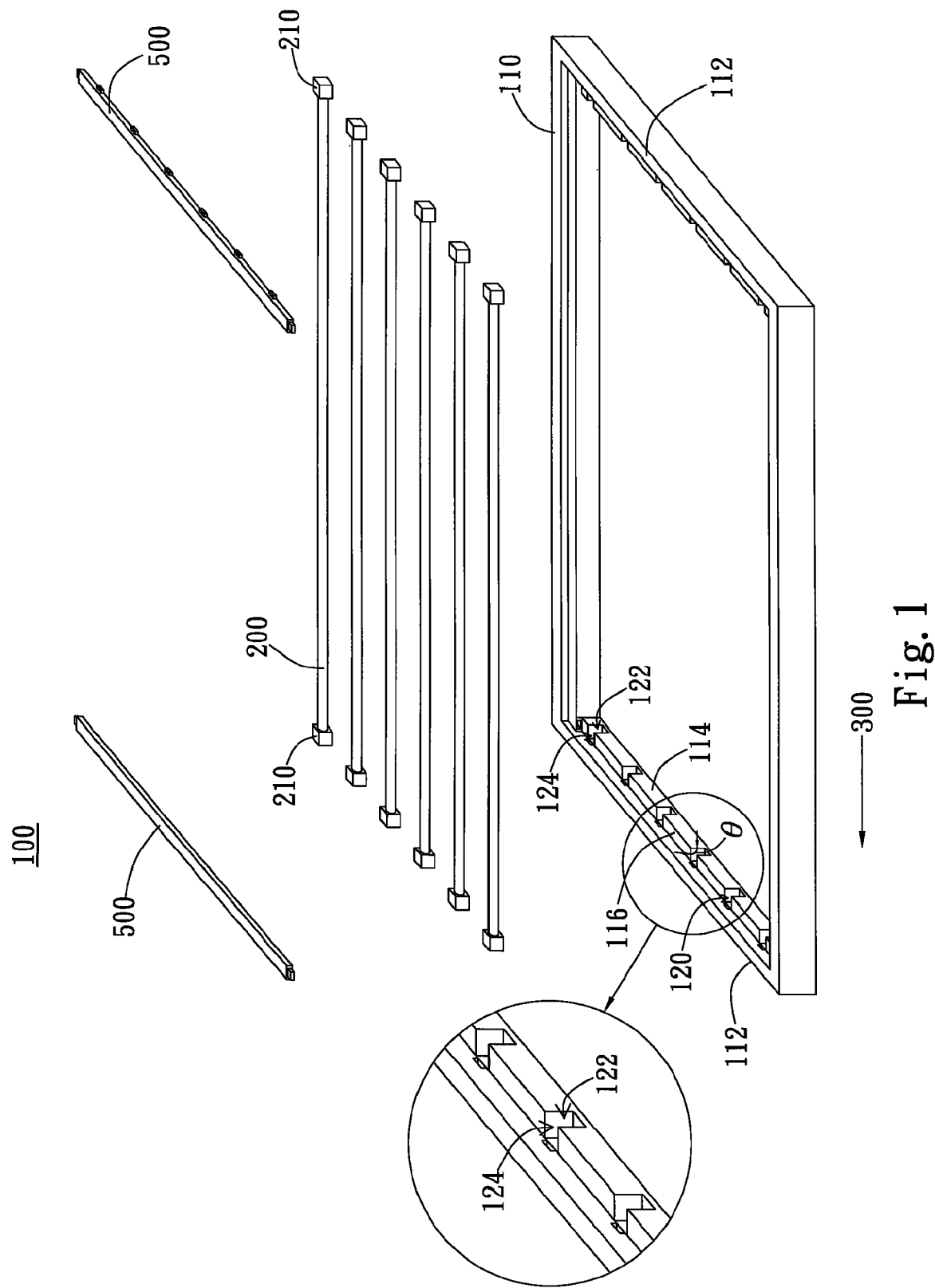
FIG. 1 illustrates an exploded view of the first embodiment of the light source module according to the present invention.
Figure 2:
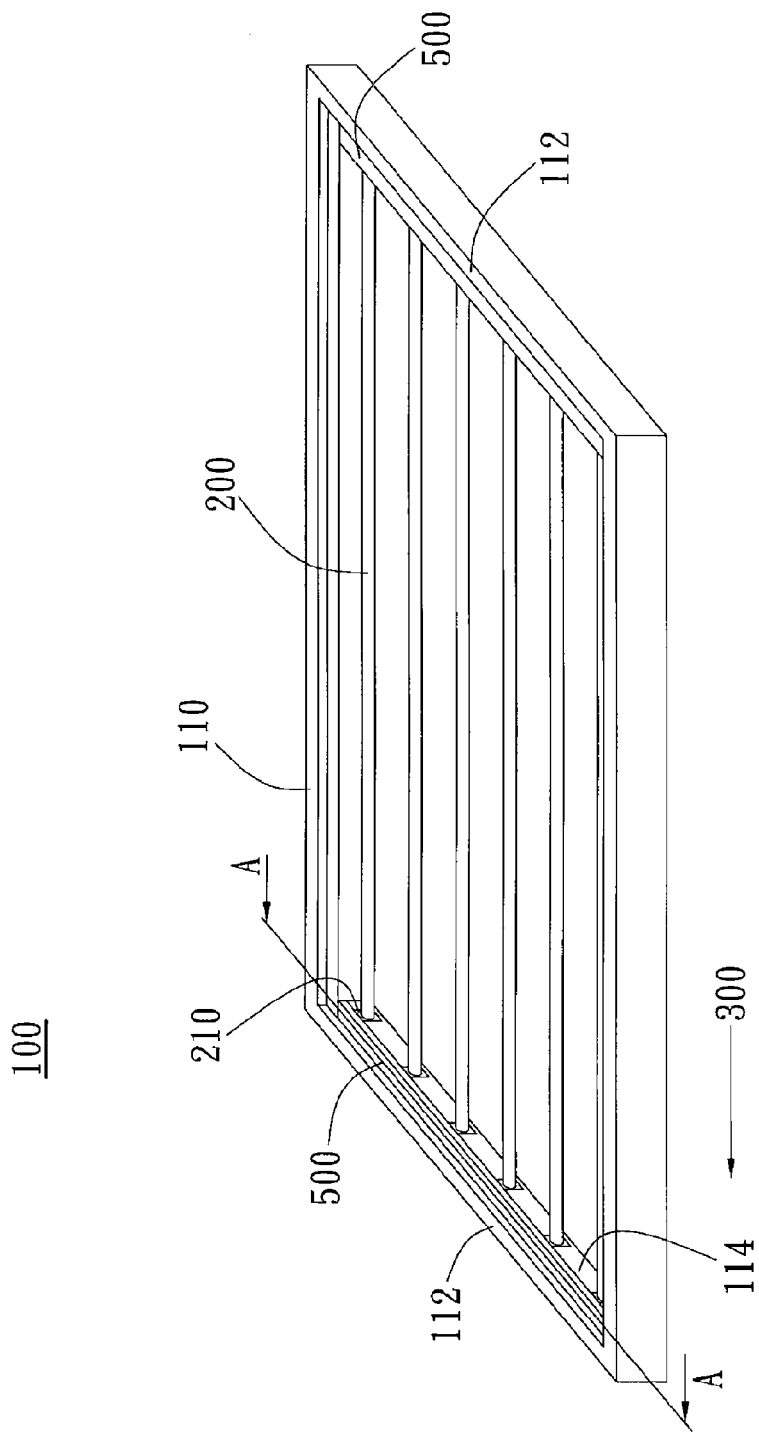
FIG. 2 shows an assembly view of FIG. 1.

As FIG. 1 and FIG. 2 shown, the present invention provides a light source module 100 to be used on the backlight module. The light source module 100 includes a frame 110, a light source 200 and a lid 500. The frame 110 has two opposite side walls 112, and each of the side walls 112 has an inner side surface 114, a top surface 116 and a cave 120. In the embodiment shown in FIG. 1, the frame 110 is shaped in a rectangle, and the two side walls 112 are respectively disposed at the two opposite sides of the rectangular frame. However, in other embodiments, the frame 110 and the side wall 112 can be formed in rectangular frame through multiple processing which assembles each of single frames 110 and each of single side walls 112 together to form the overall frame. Moreover, the material of the frame 110 and the side wall 112 preferably includes electrically insolating materials such as plastics, rubbers, resins, etc.

The cave 120 is disposed in hollows at the side wall 112 and has a first opening 122 and a second opening 124 connected with each other and formed on the inner surface 114 and the top surface 116 respectively. One of the inner surfaces 114 is facing the inner surface 114 of the opposite side wall 112, and the top surface 116 intersects the inner surface 114 with an angle $\theta$. In this embodiment, the angle $\theta$ is preferably 90 degrees. However, in other embodiments, the angle $\theta$ may include angles other than 90 degrees. In the bottom-lighting backlight module illustrated in FIG. 1, the caves 120 are uniformly distributed and equally spaced over the side wall 112. The caves 120 on two opposite side walls 112 and are corresponding to the amount of the light sources 200. However, the density of and the spacing between the caves 120 may be adjusted to comply with the brightness requirement of the backlight module.

As FIG. 1 and FIG. 2 show, the light sources 200 have two opposite ends, and each end includes a positioning block 210. The positioning block 210 engages with the cave 120 through the second opening 124, and the light source 200 extends along a first direction 300 perpendicular to the inner surface 114, through the first opening 122 and towards the opposite side wall 112 of the frame 110. The backlight module of the present embodiment preferably has a plurality of light sources 200 uniformly disposed at a plurality of the corresponding caves 120. The light source 200 includes lamps or LED modules, and the positioning block 210 is respectively engaged at two ends of the lamp. The positioning block 210 further has a hole (not illustrated) provide for the lamp to connect with the external wires or is disposed with an opening at the bottom of the positioning block 210 for the lamp to connect with the outside wires (not illustrated).

Figure 3:
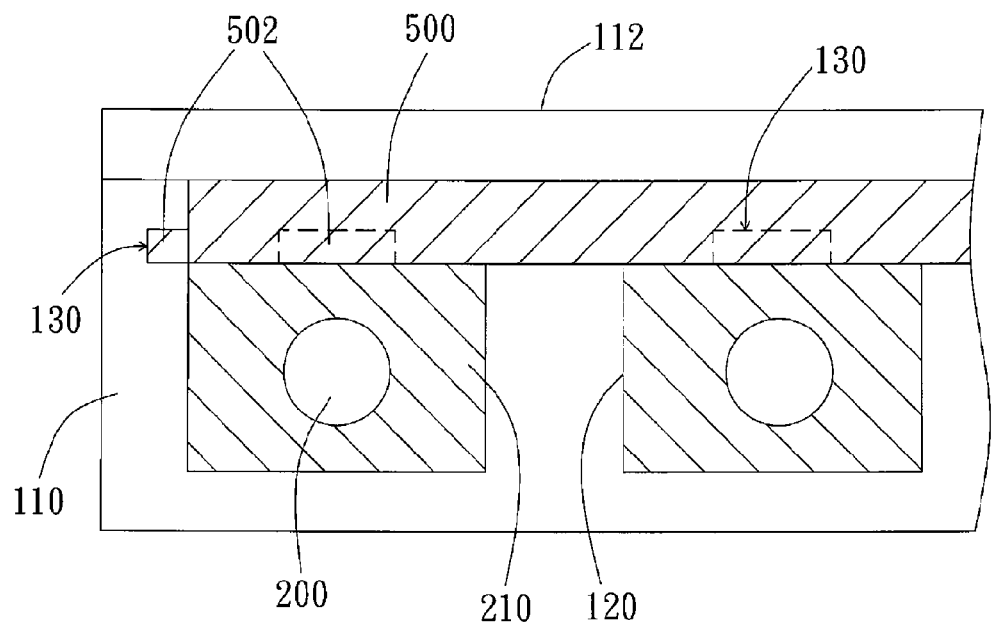
FIG. 3 illustrates a cross-sectional view along segment A-A in FIG. 2.
Figure 4:
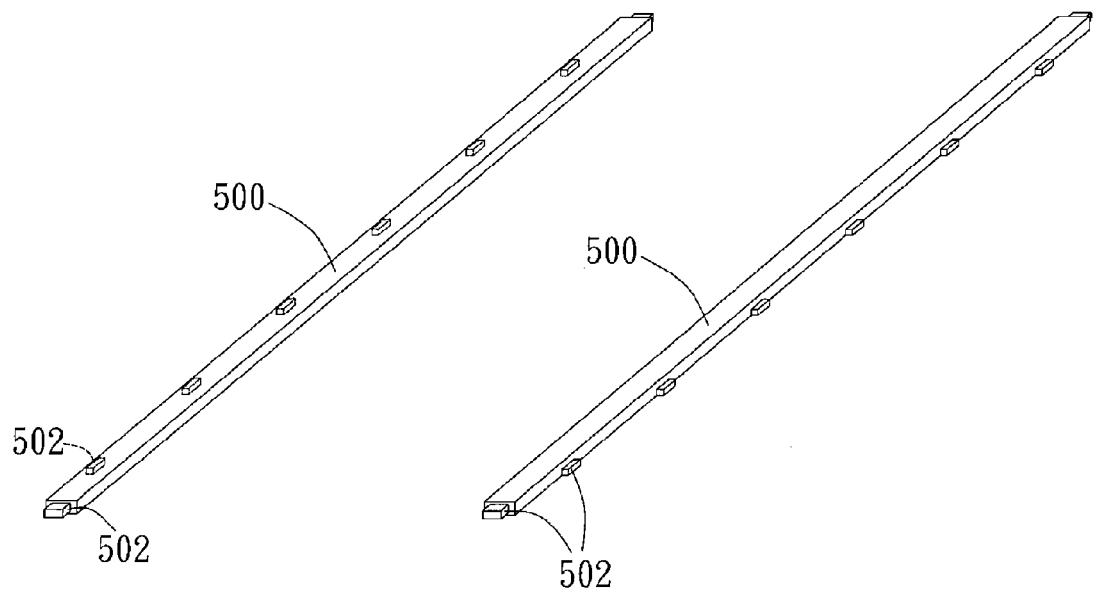
FIG. 4 illustrates a perspective view of the lid of the present invention applied in a bottom-light backlight module.

As FIG. 1 to FIG. 3 show, the lid 500 covers the second opening 120 and restricts the positioning block 210 from moving relatively to the cave 120 through the second opening 124. In other words, the orientation of the lid 500 is perpendicular to the first direction 300, i.e. perpendicular to the orientation of the light source 200. As FIG. 4 shows, the lid 500 further includes a plurality of fastener 502. In the present embodiment, the fastener 502 is preferably disposed at the two ends of lid 500 and on one single side edge of the lid 500 to engage respectively with the side wall 112 or the frame 110. However, in other embodiments, the fastener 502 can also be deposed at two ends of the lid 500 or on one single edge of the lid 500, depending on demands of the design. Furthermore, the material of the positioning block 210 of the light source 200 is preferably identical to the material of the frame 110, and both of the positioning block 210 and the frame 110 preferably have extensibility in order to engage with the cave 120 easily. When the light source 200 needs to be replaced, the fastener 502 of the lid 500 must be detached from the frame 110 or the trough 130 of the side wall 112, and then detach the lid 500 at two ends of the light source module 100 from the positioning block 210 of the light source 200. On the contrary, when the light source 200 needs to be assembled, the fastener 502 of the lid 500 must engaged with the frame 110 or the trough 130 of the side wall 112, and then two ends of the lid 500 engaged with the positioning block 210 of the light source 200, thereby the objective of replacing the light source 200 can easily achieve.

Figure 5:
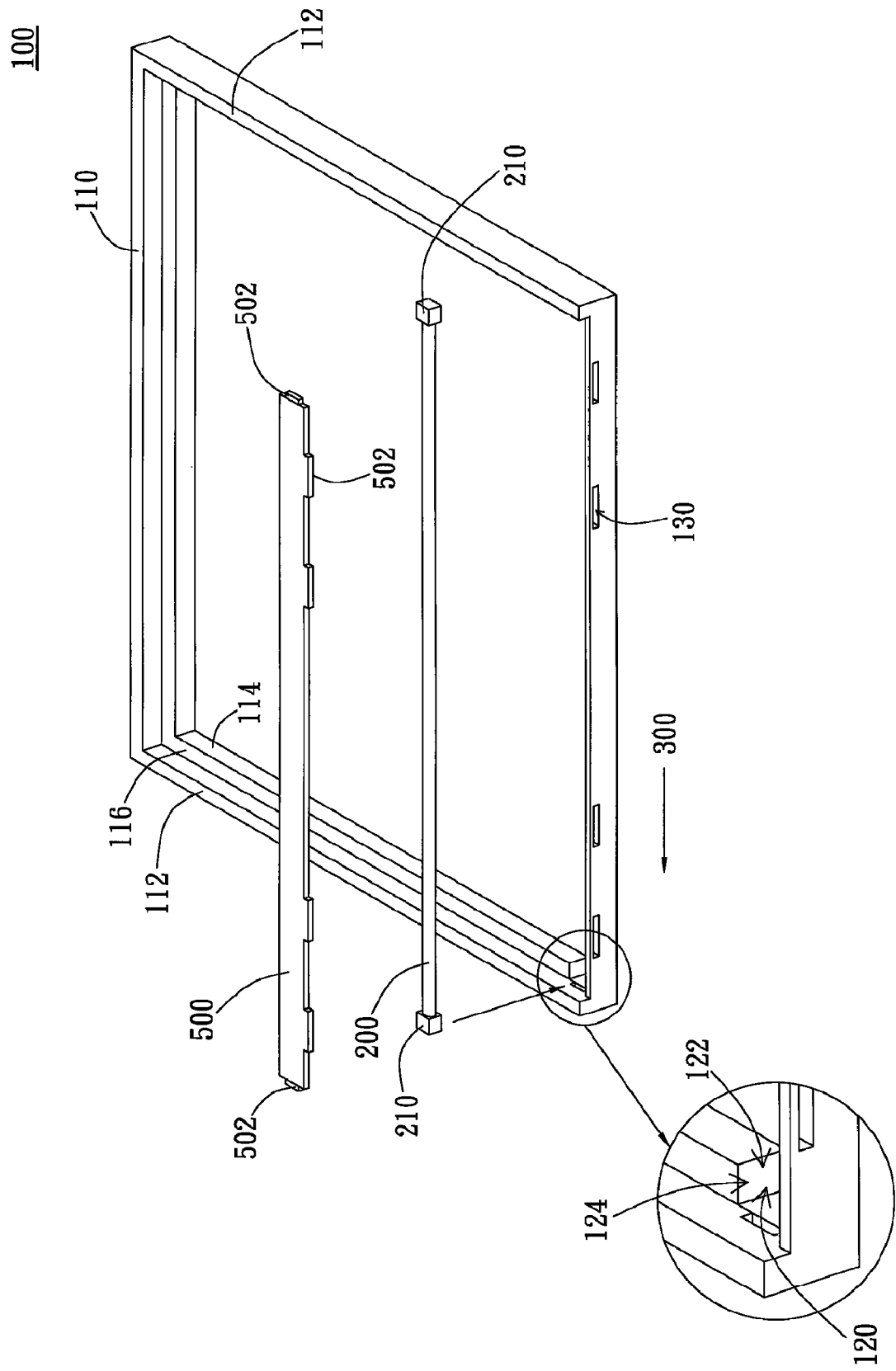
FIG. 5 illustrates an exploded view of the second embodiment of the light source module according to the present invention.
Figure 6:
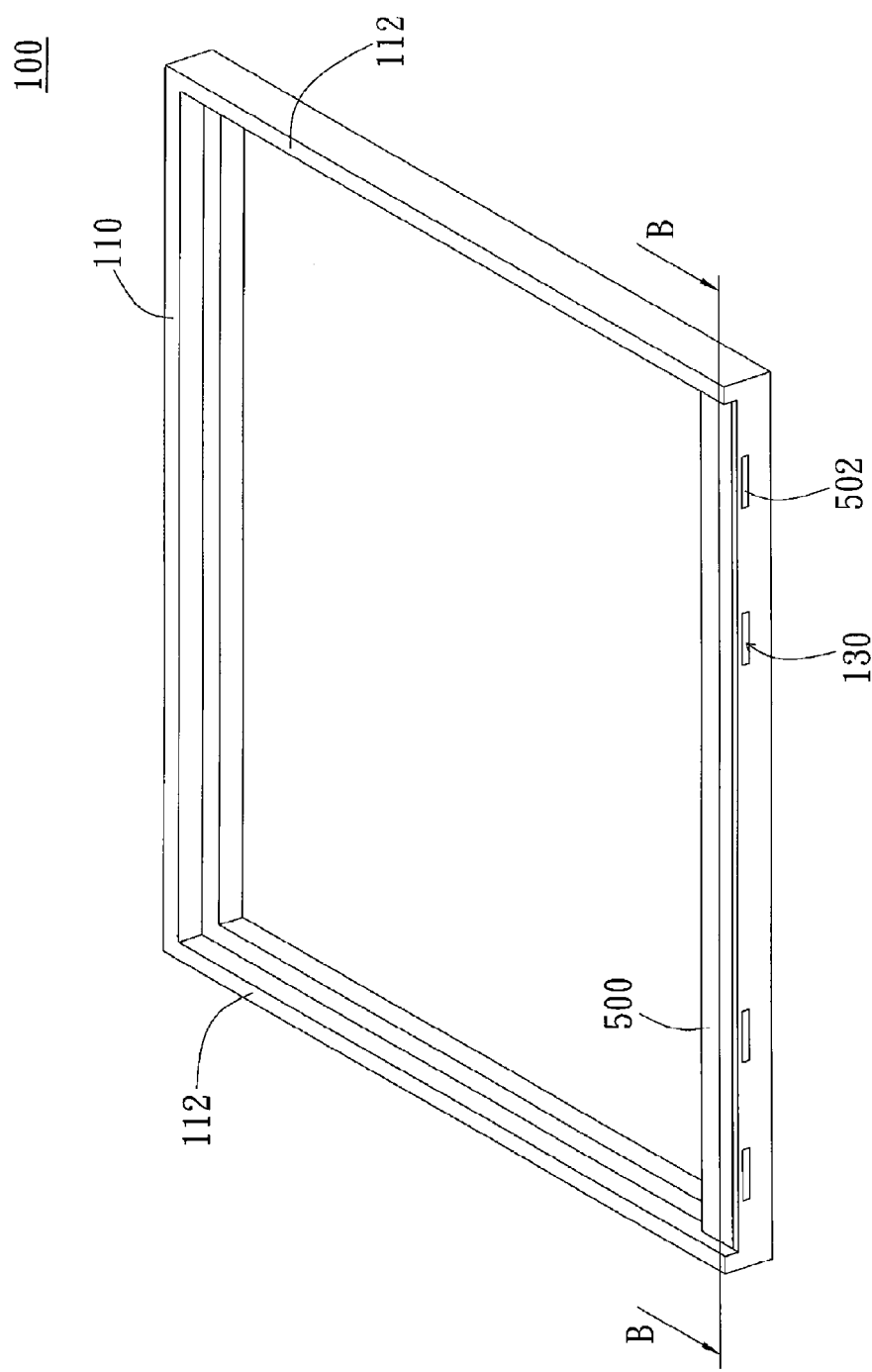
FIG. 6 shows an assembly view of FIG. 5.

The light source module 100 may also be applied to the edge-lighting backlight module. As shown in FIG. 5 and FIG. 6, in the present embodiment, each of the side walls 112 is only disposed with one cave 120, and the cave 120 is disposed at one end of the side wall 112. Each of the side walls 112 also includes an inner surface 114, a top surface 116 and a cave 120. The cave 120 has first opening 122 and a second opening 124 connected with each other on the inner surface 114 and the top surface 116 respectively. In the embodiment shown in FIG. 5 and FIG. 6, the positioning block 210 of the light source 200 engages with the cave 120 through the second opening 124, and the light source 200 extends along a first direction 300 perpendicular to the inner surface 114, through the first opening 122 towards the opposite sidewall 112 of the frame 110. The two positioning blocks 210 of the single light source 200 that are respectively disposed corresponding to the cave 120.

Figure 7:
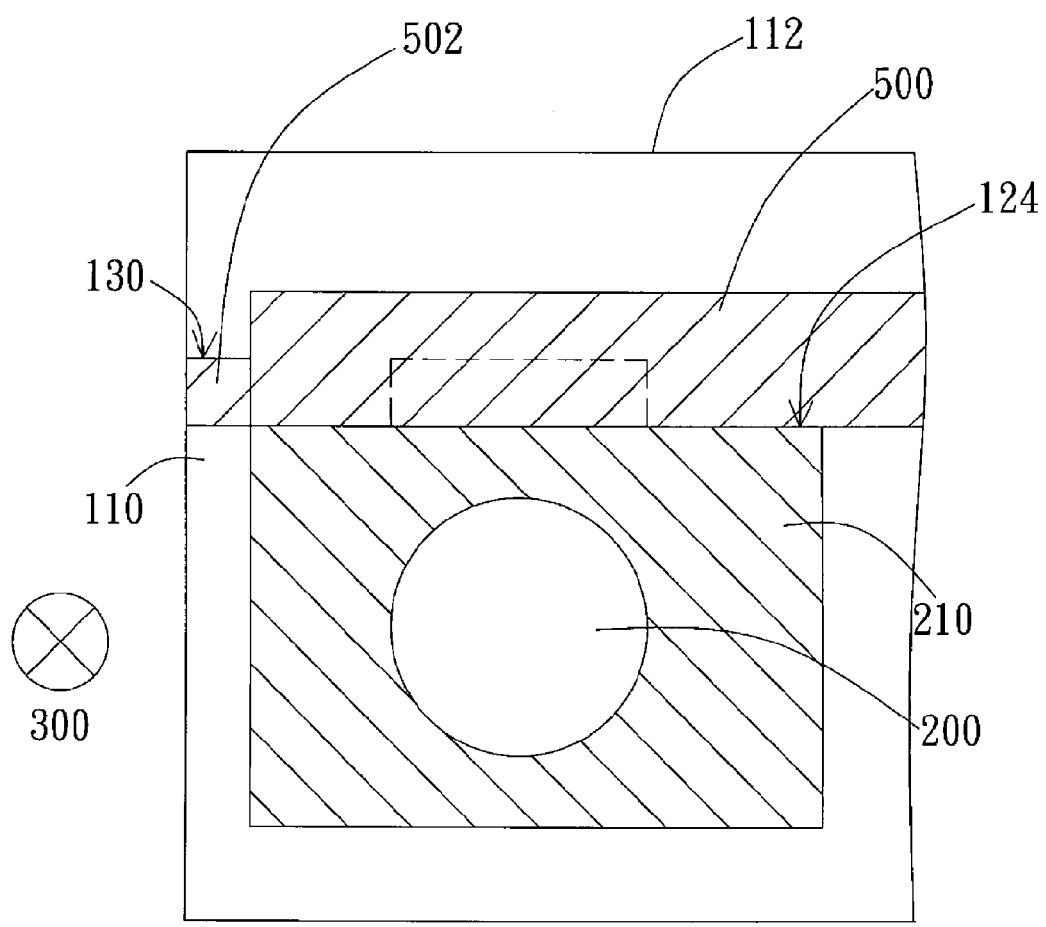
FIG. 7 illustrates a cross-sectional view along segment B-B in FIG. 6.
Figure 8A:
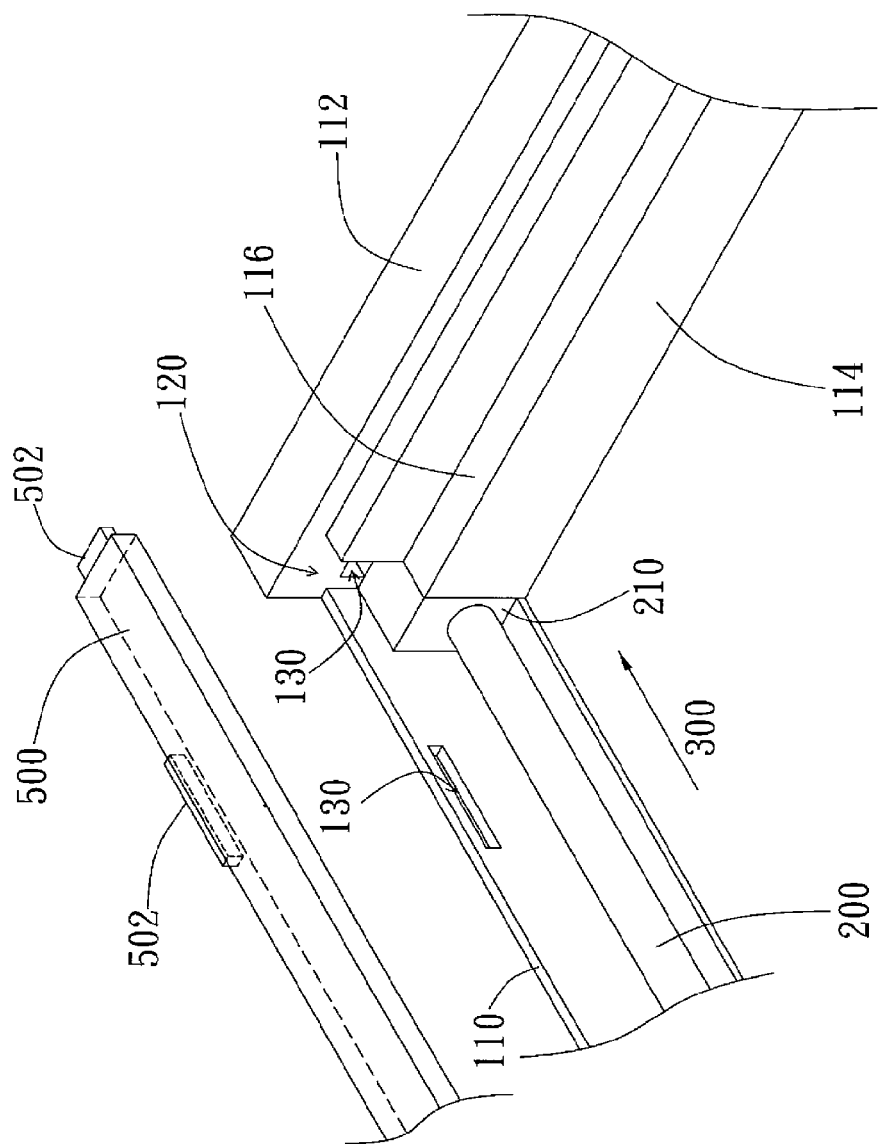
FIG. 8a illustrates another perspective view of the lid engaged with the trough of the present invention applied in an edge-lighting backlight module.
Figure 8B:
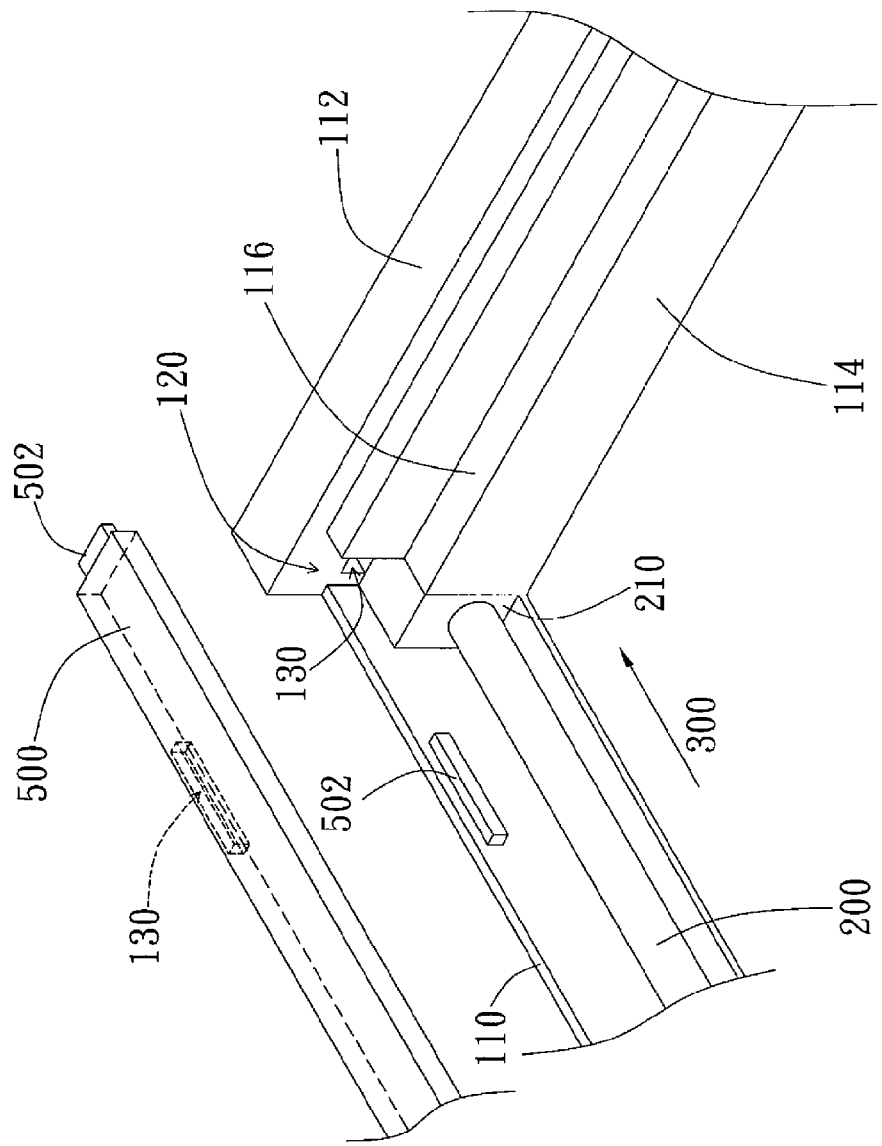
FIG. 8b illustrates another perspective view of the lid engaged with the trough of the present invention applied in an edge-lighting backlight module.

As FIG. 5 to FIG. 7 show, the lid 500 covers the second opening 124 and the light source 200 and also restricts the positioning block 210 from moving relative to the cave 120 through the second opening 124. In the present embodiments, the lid 500 is parallel to the light source 200, and extends along the bottom end of the frame 110 with the light source 200. As FIG. 8a shows, the lid 500 preferably has a plurality of fasteners 502 provided for engaging with the frame 110 or the trough 130 of the side wall 112. The fastener 502 is preferably disposed respectively on only single edge or two ends of the lid 500. In another embodiment shown in FIG. 8b, the side edge of the lid 500 may also be disposed with a plurality of the troughs 130 while the frame 110 may be disposed with the fastener 502 corresponding to the trough 130. In addition, in other embodiments, the fastener 502 may also be disposed only at the two ends of the lid 500 or disposed at only one lateral side of the lid 500.

Figure 9A:
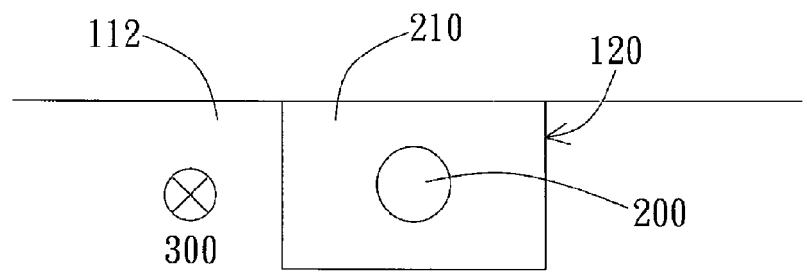
FIG. 9a illustrates an cross-sectional view of the positioning block engaged with the cave according to the present invention.
Figure 9B:
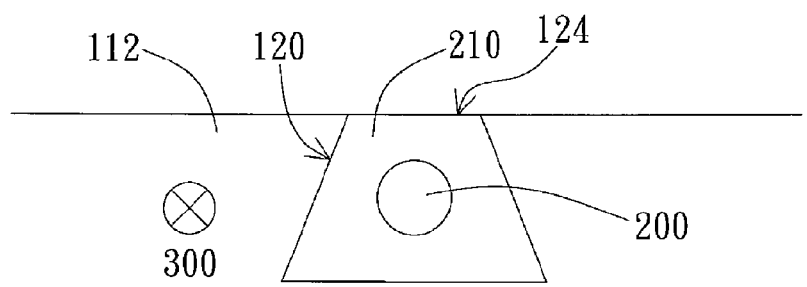
FIG. 9b illustrates another cross-sectional view of the positioning block engaged with the cave according to the present invention.
Figure 9C:
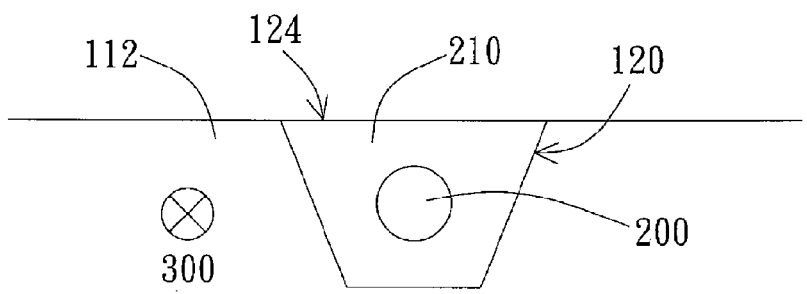
FIG. 9c illustrates another cross-sectional view of the positioning block engaged with the cave according to the present invention.
Figure 9D:
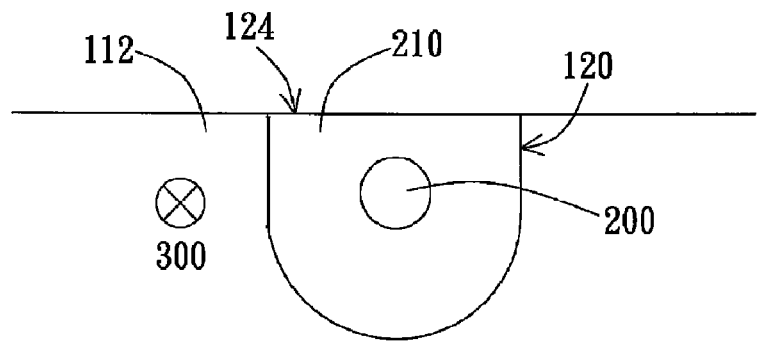
FIG. 9d illustrates another cross-sectional view of the positioning block engaged with the cave according to the present invention.
Figure 9E:
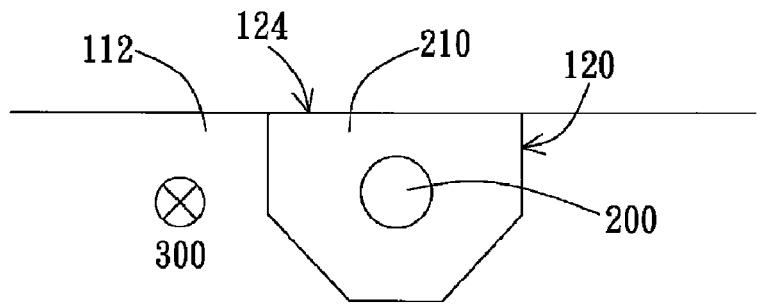
FIG. 9e illustrates another cross-sectional view of the positioning block engaged with the cave according to the present invention.
Figure 9F:
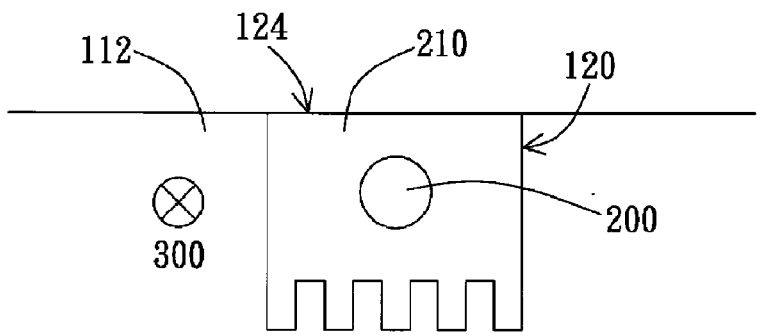
FIG. 9f illustrates another cross-sectional view of the positioning block engaged with the cave according to the present invention.

As FIG. 9a shows, a cross-sectional shape of the cave 120 perpendicular to the first direction 300 is identical to a cross-sectional shape of the positioning block 210 along the first direction 300. In other words, the light source 200 can be engaged with the cave 120 by using with the positioning block 210. In the embodiment shown in FIG. 9a, the cross-sectional shape of the positioning block 210 and the cave 120 corresponding thereto are both rectangular. However, in the embodiment shown in FIG. 9b, both of the cross-sectional shape of the positioning block 210 and the cave 120 in the first direction 300 are shaped in a trapezoid. As for the above-mentioned trapezoid, the shorter edge of the trapezoid is closer to the second opening 124 than the longer edge of the trapezoid, i.e. the longer edge and the short edge are the parallel lines of the trapezoid. In this circumstance, the material of the positioning block 210 needs to have extensibility in order to engage with the cave 120 more easily. However, in the embodiment shown in FIG. 9c, the longer edge of the trapezoid is closer to the second opening 124 than the shorter edge of the trapezoid. In the embodiment shown in FIG. 9d, the positioning block 210 is shaped in an arc and the arc faces the end of the cave 120. However, in the embodiment shown in FIG. 9e and FIG. 9f, the cross-sectional shape of the positioning block 210 and the cave 120 face the first direction 300 can also be a polygon.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A light source module for using in a backlight module, comprising:
    a frame having two opposite side walls and a trough, each of the side walls including an inner side surface, a top surface and a cave, the cave having a first opening and a second opening connected with each other on the inner surface and the top surface respectively, wherein each of the inner surfaces is facing the other side wall, and the top surface intersects the inner surface with an angle;
    a light source having two opposite ends, each end including a positioning block, wherein the positioning block engages with the cave through the second opening, and the light source extends along a first direction perpendicular to the inner surface, through the first opening and toward the opposite side wall of the frame; and
    a lid having a fastener and covering the second opening and restricting the positioning block from moving relatively to the cave from the second opening, wherein the trough is engaged with the fastener.

2. The light source module of claim 1, wherein a cross-sectional shape of the cave perpendicular to the first direction is identical to a cross-sectional shape of the positioning block in the first direction.

3. The light source module of claim 2, wherein the cross-sectional shape of the positioning block in the first direction is rectangular.

4. The light source module of claim 2, wherein the cross-sectional shape of the positioning block in the first direction is a trapezoid.

5. The light source module of claim 2, wherein the positioning block is shaped in an arc and toward the end of the cave.

6. The light source module of claim 2, wherein the cross-sectional of the positioning block in the first direction is a polygon.

7. The light source module of claim 4, wherein the longer edge of the trapezoid is closer to the second opening than the shorter edge of the trapezoid.

8. The light source module of claim 4, wherein the short side of the trapezoid is closer to the second opening than the length side of the trapezoid.

9. The light source module of claim 1, wherein the positioning block includes an elastic material.

10. The light source module of claims 1, wherein the cave is disposed at the bottom of the side wall of the frame.

11. The light source module of claim 10, wherein the lid is parallel to the first direction and covers the light source.

12. The light source module of claim 1 further comprising a plurality of light sources, wherein the side wall includes a plurality of caves uniformly distributed over the side wall, and the light sources are respectively disposed corresponding to the caves.

13. The light source module of claim 12, wherein the lid is parallel to one of the two side walls and covers the side wall.

14. The light source module of claim 1, wherein the positioning block includes an isolating material.

15. A backlight module comprising the light source module of one of the claims 1 to 14.

16. A light source module for using in a backlight module, comprising:
    a frame having two opposite side walls and a fastener, each of the side walls including an inner side surface, a top surface and a cave, the cave having a first opening and a second opening connected with each other on the inner surface and the top surface respectively, wherein each of the inner surfaces is facing the other side wall, and the top surface intersects the inner surface with an angle;
    a light source having two opposite ends, each end including a positioning block, wherein the positioning block engages with the cave through the second opening, and the light source extends along a first direction perpendicular to the inner surface, through the first opening and toward the opposite side wall of the frame; and
    a lid having a trough and covering the second opening and restricting the positioning block from moving relatively to the cave from the second opening, wherein the trough is engaged with the fastener.

* * * * *